United States Patent [19]
Keim

[11] 3,772,076

[45] Nov. 13, 1973

[54] REACTION PRODUCTS OF EPIHALOHYDRIN AND POLYMERS OF DIALLYLAMINE AND THEIR USE IN PAPER

[75] Inventor: Gerald I. Keim, West Grove, Pa.

[73] Assignee: Hercules Incorporated, Wilmington, Del.

[22] Filed: Mar. 14, 1972

[21] Appl. No.: 234,669

Related U.S. Application Data

[60] Division of Ser. No. 30,986, April 22, 1970, Pat. No. 3,700,623, which is a continuation-in-part of Ser. No. 5,956, Jan. 26, 1970, abandoned.

[52] U.S. Cl.............. 117/155 R, 162/168, 162/169
[51] Int. Cl................................................ D21h 1/38
[58] Field of Search................ 117/155 R; 162/164, 162/168, 169; 260/28 P, 79.3 A, 79.3 R, 89.7 N, 874, 80.3 R

[56] References Cited
UNITED STATES PATENTS

| | | | |
|---|---|---|---|
| 2,926,161 | 2/1960 | Butler | 260/89.7 |
| 3,240,761 | 3/1966 | Keim et al. | 162/164 X |
| 3,332,901 | 7/1967 | Keim | 162/164 X |
| 3,375,233 | 3/1968 | Harada | 260/79.3 |
| 3,442,754 | 5/1969 | Espy | 162/164 |
| 3,496,121 | 2/1970 | Shen | 260/2 |
| 3,515,707 | 6/1970 | Reimschuessel | 260/89.9 |
| 3,577,313 | 5/1971 | Bolger et al. | 162/164 |
| 3,640,840 | 2/1972 | Zieman et al. | 162/164 |

*Primary Examiner*—Murray Katz
*Assistant Examiner*—M. R. Lusignan
*Attorney*—Hazel L. Deming et al.

[57] ABSTRACT

Water-soluble, alkaline curing resins which are the reaction products of an epihalohydrin and a polymer of a diallylamine are disclosed. The resins are particularly useful as wet strength agents for paper and additionally give superior dry strength to paper.

14 Claims, No Drawings

REACTION PRODUCTS OF EPIHALOHYDRIN AND POLYMERS OF DIALLYLAMINE AND THEIR USE IN PAPER

This application is a division of my application U.S. Ser. No. 30,986, filed Apr. 22, 1970 and now U.S. Pat. No. 3,700,623 issued Oct. 24, 1972 which is in turn a continuation-in-part of my prior U.S. application Ser. No. 5,956 filed Jan. 26, 1970, and now abandoned.

This invention relates to water-soluble, alkaline curing resins and more particularly to the water-soluble resinous reaction products of a polymer of a diallylamine or an N-substituted-diallylamine and an epihalohydrin, and to their use in the manufacture of paper having good wet strength properties and good dry strength properties.

It is known that the hydrohalide salts of the diallylamines and the N-alkyldiallylamines can be homopolymerized or copolymerized using free radical catalysts to give water-soluble, linear polymer salts which yield on neutralization the free bases or free amine polymers.

It is also known from Keim, U.S. Pat. No. 2,926,154 and from Earle, Jr., U.S. Pat. No. 3,240,664 that water-soluble, alkaline curing resins can be prepared by reacting epichlorohydrin with long chain polyamides containing secondary amino groups or with polyaminoureylenes containing tertiary amino groups under alkaline conditions. These resins when used for the wet strengthening of paper are fast curing on the machine and do not require an aging period or treatment at elevated temperature in order to obtain significant wet strength development.

Now, in accordance with this invention it has been found that fast curing, efficient, water-soluble cationic thermosetting resins can be prepared by reacting an epihalohydrin, and particularly epichlorohydrin, with polymers of certain amines, and that the resins so produced provide all of the advantages of the prior art resins and additionally give superior dry strength to paper.

Accordingly, the present invention relates to the water-soluble resinous reaction product of (A) a linear polymer having units of the formula (I) 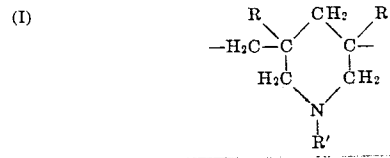

where R is hydrogen or lower alkyl and R' is hydrogen, alkyl or a substituted alkyl group and (B) an epihalohydrin, and to their use in making wet strength paper.

In the above formula, each R can be the same or different and, as stated, can be hydrogen or lower alkyl. Suitable alkyl groups contain from one to six carbons and are preferably methyl, ethyl, isopropyl or n-butyl. R' of the formula represents hydrogen, alkyl or substituted alkyl groups. Typical alkyl groups, which R' can be, contain from one to eighteen carbon atoms and preferably from one to six carbon atoms and include methyl, ethyl, propyl, isopropyl, butyl, tert-butyl, hexyl, octyl, decyl, dodecyl, tetradecyl, octadecyl and the like. The R' can also be a substituted alkyl group. Suitable substituents include, in general, any group which will not interfere with polymerization through a vinyl double bond. Typically, the substituents can be carboxylate, cyano, ether, amino (primary, secondary or tertiary), amide, hydrazide, hydroxyl and the like.

Polymers having units of the above formula can be produced by polymerizing the hydrohalide salt of a diallylamine (II) 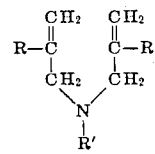

where R and R' are as indicated above, either alone or as a mixture with other copolymerizable ingredients, in the presence of a free radical catalyst and then neutralizing the salt to give the polymer free base.

Specific hydrohalide salts of the diallylamines which can be polymerized to provide the polymer units of the invention include diallylamine hydrochloride
N-methyldiallylamine hydrobromide
2,2'-dimethyl-N-methyldiallylamine hydrochloride
N-ethyldiallylamine hydrobromide
N-isopropyldiallylamine hydrochloride
N-n-butyldiallylamine hydrobromide
N-tert-butyldiallylamine hydrochloride
N-n-hexyldiallylamine hydrochloride
N-octadecyldiallylamine hydrochloride
N-acetamidodiallylamine hydrochloride
N-cyanomethyldiallylamine hydrochloride
N-β-propionamidodiallylamine hydrobromide
N-acetic ethyl ester substituted diallylamine hydrochloride
N-ethylmethylether substituted diallylamine hydrobromide
N-β-ethylaminediallylamine hydrochloride
N-hydroxyethyldiallylamine hydrobromide and
N-aceto-hydrazide substituted diallylamine hydrochloride.

Diallylamines and N-alkyldiallylamines, used to prepare the polymers employed in this invention, can be prepared by the reaction of ammonia or a primary amine with an allyl halide employing as a catalyst for the reaction a catalyst that promotes the ionization of the halide such, for example, as sodium iodide, zinc iodide, ammonium iodide, cupric bromide, ferric chloride, ferric bromide, zinc chloride, mercuric iodide, mercuric nitrate, mercuric bromide, mercuric chloride, and mixtures of two or more. Thus, for example N-methyldiallylamine, in good yield, can be prepared by reaction of two moles of an allyl halide, such as allyl chloride, with one mole of methylamine in the presence of an ionization catalyst such as one of those enumerated above.

In preparing the homopolymers and copolymers for use in this invention, reaction can be initiated by redox catalytic system as indicated in Example 5. In a redox system, the catalyst is activated by means of a reducing agent which produces free radicals without the use of heat. Reducing agents commonly used are sodium metabisulfite and potassium metabisulfite. Other reducing agents include water-soluble thiosulfates and bisulfites, hydrosulfites and reducing salts such as the sulfate of a metal which is capable of existing in more than one valence state such as cobalt, iron, manganese and copper. A specific example of such a sulfate is ferrous sulfate. The use of a redox initiator system has several advantages, the most important of which is efficient polymerization at lower temperatures. Conventional peroxide catalysts such as tertiary-butyl hydroperoxide, potassium persulfate, hydrogen peroxide, and ammonium persulfate used in conjunction with the above reducing agents or metal activators, can be employed.

As stated above, the linear polymers of diallylamines which are reacted with an epihalohydrin in accordance with this invention can contain different units of formula (I) and/or contain units of one or more other copolymerizable monomers. Typically, the comonomer is a different diallylamine, a monoethylenically unsaturated compound containing a single vinylidene group or sulfur dioxide, and is present in an amount ranging from 0 to 95 mole percent of the polymer. Thus the polymers of diallylamine are linear polymers wherein from 5 to 100 percent of the recurring units have the formula (I) and from 0 to 95 percent of the recurring units are monomer units derived from (1) a vinylidene monomer and/or (2) sulfur dioxide. Preferred comonomers include acrylic acid, methacrylic acid, methyl and other alkyl acrylates and methacrylates, acrylamide, methacrylamide, acrylonitrile, methacrylonitrile, vinyl acetate, vinyl ethers such as the alkyl vinyl ethers, vinyl ketones such as methyl vinyl ketone and ethyl vinyl ketone, vinyl sulfonamide, sulfur dioxide or a different diallylamine embraced by the above formula (II).

Specific copolymers which can be reacted with an epihalohydrin include copolymers of N-methyldiallylamine and sulfur dioxide; copolymers of N-methyldiallylamine and diallylamine; copolymers of diallylamine and acrylamide; copolymers of diallylamine and acrylic acid; copolymers of N-methyldiallylamine and methyl acrylate; copolymers of diallylamine and acrylonitrile; copolymers of N-methyldiallylamine and vinyl acetate; copolymers of diallylamine and methyl vinyl ether; copolymers of N-methyldiallylamine and vinylsulfonamide; copolymers of N-methyldiallylamine and methyl vinyl ketone; terpolymers of diallylamine, sulfur dioxide and acrylamide; and terpolymers of N-methyldiallylamine, acrylic acid and acrylamide.

The epihalohydrin which is reacted with the polymer of a diallylamine can be any epihalohydrin, i.e., epichlorohydrin, epibromohydrin, epifluorohydrin or epiiodohydrin and is preferably epichlorohydrin. In general, the epihalohydrin is used in an amount ranging from about 0.5 mole to about 1.5 moles and preferably about 1 mole to about 1.5 moles per mole of secondary plus tertiary amine present in the polymer.

The resinous reaction products of the invention can be prepared by reacting a homopolymer or copolymer of a diallylamine as set forth above with an epihalohydrin at a temperature of from about 30°C. to about 80°C. and preferably from about 40°C. to about 60°C. until the viscosity measured on a solution containing 20% to 30% solids at 25°C. has reached a range of A to E and preferably about C to D on the Gardner-Holdt scale. The reaction is preferably carried out in aqueous solution to moderate the reaction, and at a pH of from about 7 to about 9.5.

When the desired viscosity is reached, sufficient water is added to adjust the solids content of the resin solution to about 15% or less and the product cooled to room temperature (about 25°C.). The resin solution can be used as such or, if desired, can be adjusted to a pH of at least about 6 and preferably to a pH of about 5. Any suitable acid such as hydrochloric, sulfuric, nitric, formic, phosphoric and acetic acid can be used to adjust the pH.

The aqueous resin solutions can be applied to paper or other felted cellulosic products by tub application or by spraying, if desired. Thus, for example, preformed and partially or completely dried paper can be impregnated by immersion in, or spraying with, an aqueous solution of the resin, following which the paper can be heated for about 0.5 minute to 30 minutes at temperatures of 90°C. to 100°C. or higher to dry same and cure the resin to a water-insoluble condition. The resulting paper has greatly increased wet and dry strength, and therefore this method is well suited for the impregnation of paper such as wrapping paper, bag paper and the like, to impart both wet and dry strength characteristics thereto.

The preferred method of incorporating these resins in paper, however, is by internal addition prior to sheet formation, whereby advantage is taken of the substantivity of the resins for hydrated cellulosic fibers. In practicing this method, an aqueous solution of the resin in its uncured and hydrophilic state is added to an aqueous suspension of paper stock in the beater, stock chest, Jordan engine, fan pump, head box or at any other suitable point ahead of sheet formation. The sheet is then formed and dried in the usual manner.

The "off-the-machine" wet strength obtained with the resins of the invention will be satisfactory for most applications. Additional wet strength can be obtained by subjecting the paper to a heat treatment. Satisfactory temperatures will be of the order of from about 105°C. to about 150°C. for a period of time from about 12 to 60 minutes, time varying inversely with temperature.

While the reaction products herein described impart substantial wet strength to paper they also improve the dry strength of paper by as much as 40% or more when present therein in relatively small amounts, i.e., about 0.01% or more, based on the dry weight of the paper. Generally, it will be desirable to use from about 0.1–3% by weight, based on the dry weight of the paper. However, amounts up to 5% or more by weight, based on the dry weight of the paper, can be used if desired.

The following examples illustrate the invention. All percentages are by weight unless otherwise indicated.

EXAMPLE 1

Part 1 - A poly(diallylamine hydrochloride) is prepared as follows. Into a pop bottle equipped with a magnetic stirring bar and containing 117 grams (0.88 mole) of diallylamine hydrochloride, is injected 224 grams of dimethyl sulfoxide to give a 35% solution. The bottle and contents are cooled in an ice bath, and 5.85 grams of ammonium persulfate as a 33% solution in dimethyl sulfoxide is introduced into the bottle. The bottle is evacuated and filled with nitrogen five times and then the bottle contents are allowed to warm to room temperature. The bottle is next immersed in a 30°C. bath and maintained therein for 96 hours, after which time the bottle is removed from the bath and vented. The contents are poured into a large volume of acetone, yielding a light tan, hygroscopic solid. The solid is separated from the acetone by centrifugation, washed with acetone, filtered and dried at 50°C. under vacuum. The product (59 grams) is water-soluble, has a reduced specific viscosity (RSV) of 0.21 as determined on a 0.1% solution in aqueous 1 molar sodium chloride at 25°C. and contains by analysis, 16.05% nitrogen and 21.52% chloride ions. Part 2 - A poly(diallylamine)-epichlorohydrin resin is prepared as follows: 14.45 grams (equivalent to 0.11 mole of monomer unit) of the poly(diallylamine hydrochloride) prepared above in Part 1 is dissolved in 20 grams of water to give a dark brown viscous solution having a pH of 0.9. One molar aqueous sodium hydroxide is added to the solution to adjust the pH to 8.5, and the solution is transferred to a reaction flask equipped with a thermometer, stirrer and heating mantle. Next 14.8 grams (0.16 mole) of epichlorohydrin is added to the flask and sufficient water is introduced to give a reaction medium of 30% reaction solids. The contents of the flask are then raised to 50°C. and maintained thereat for 30 minutes, after which time the solution is cooled and diluted to 5% solids. Portions of the solution are adjusted to a pH of 7.0 and 5.0 using 1.0 molar hydrochloric acid and are evaluated in Rayonier bleached kraft pulp for wet-strengthening properties. The procedure utilized in the evaluation is as follows:

Rayonier bleached kraft pulp is beaten at 2.5% consistency in a cycle beater to 840 cc. Schopper-Riegler freeness. The pulp id diluted to 0.28% consistency in the proportioner of a standard Nobel & Wood handsheet machine. The products to be evaluated are added to the proportioner as 2% solids solutions to give 1.0% product based on pulp. The pulp stock is then formed into handsheets having a basis weight of 40 pounds/ream, and the sheets are dried on a drum drier to a moisture content of about 5%. A portion of the resulting handsheets are given an additional cure by heating one hour at 105°C. The sheets tested for wet strength are soaked for 2 hours at 25°C. in distilled water prior to testing. Paper from pulp treated with the product solution adjusted to a pH of 7.0 has a wet tensile strength of 2.15 pounds/inch width, uncured, and 3.99 pounds/inch width, cured. Paper from pulp treated with the product solution adjusted to a pH of 5.0 has a wet tensile strength of 1.94 pounds/inch width, uncured, and 3.58 pounds/inch width, cured.

EXAMPLE 2

The procedure of Example 1 is repeated except that in this example the polymer which is reacted with epichlorohydrin is poly(N-methyldiallylamine hydrochloride). The poly(N-methyldiallylamine hydrochloride) is prepared in the manner of Part 1, except that 54.5 grams of N-methyldiallylamine hydrochloride are substituted for 117 grams of diallylamine hydrochloride and 101.5 grams of dimethylsulfoxide and 3.53 grams of ammonium persulfate are used. The polymer (18 grams) is water-soluble, has an RSV of 0.31 as measured on a 0.1% solution in aqueous 1 molar sodium chloride at 25°C. and contains by analysis 9.21% nitrogen. This polymer (14.05 grams; equivalent to 0.094 mole of monomer unit) is dissolved in 22 grams of water to give an orange viscous solution of pH 1.0 and the solution, after pH adjustment to 8.5, is reacted with 12.95 grams (0.14 mole) of epichlorohydrin following the procedure of Part 2 except that the reaction temperature is 50° to 53°C. and the diluted solution (5% solids) is adjusted to a pH of 7.0. Evaluation of the product of this example in pulp according to the procedure of Example 1 gives a wet tensile strength of 4.34 pounds/inch width, uncured, and 6.24 pounds/inch width, cured.

If the resinous product contains epoxide groups, as in the case of homopolymers or copolymers of the N-substituted diallylamines, it is desirable to stabilize the aqueous resin solution by the addition thereto of a water-soluble acid, preferably a hydrogen halide acid, such as hydrochloric acid, in an amount sufficient to convert the secondary or tertiary amino groups to the corresponding amine salts and to cause halide ions to react with the epoxy groups to form halohydrin moieties. Water-soluble acids, other than hydrogen halide acids, can be used if the halide ion concentration of the reaction mixture is sufficiently high, e.g., at least 0.1N, and the reactivity of nucleophilicity of the acid anion is sufficiently low that the epoxide groups are converted essentially completely to the halohydrin. Examples of suitable hydrogen halide acids are hydrochloric acid, hydrobromic acid, hydrofluoric acid and hydroiodic acid. Examples of other water-soluble acids that can be employed include sulfuric acid, nitric acid, phosphoric acid, formic acid and acetic acid. All the acid can be added at once or it can be added in increments or continuously over a period of time, e.g. 5 to 120 minutes, while heating at temperatures of from about 40°C. to about 80°C., or over a period of several days to several weeks at room temperature. Once the resin is effectively stabilized, the pH can be adjusted to within the range of about 2.0 to 7.0 with a base to prevent irreversible hydrolysis of the polymer backbone. Sufficient water is then added to adjust the solids content of the aqueous resin solution to the desired amount.

The amount of acid required will usually approach stoichiometric equivalence to the amount of epihalohydrin used to prepare the resin. However, satisfactory results are obtained if the ratio of equivalents of acid to equivalents (moles) of epihalohydrin is from about 0.3 to about 1.2.

The acid stabilized resins prepared from polymers of the N-substituted diallylamines are unique in that they can be dried in conventional manner, as by spray drying, freeze drying, roll drying, oven drying or vacuum drying techniques.

The stabilized resins prior to use, if in dry form, are redissolved in water and the solution adjusted to the desired solids content. The solutions are then activated for use by adding an amount of base, either as a solid or as a solution, sufficient to reconvert the halohydrin groups to epoxides. This will usually require an amount of base approximately chemically equivalent to the amount of stabilizing acid present. However, from about 0.25 to about 2.5 times this amount can be used. Both organic and inorganic bases can be used for activation. Typical bases which can be used are the alkali metal hydroxides, carbonates and bicarbonates, calcium hydroxide, pyridine, benzyltrimethylammonium hydroxide, tetramethylammonium hydroxide, tetraethylammonium hydroxide, and mixtures thereof.

The following examples illustrate further embodiments of the invention.

EXAMPLE 3

Part 1 - A copolymer of N-methyldiallylamine hydrochloride and sulfur dioxide is prepared as follows. Into a reaction flask equipped with cooling means is introduced a solution of 30.3 grams of N-methyldiallylamine in 156 grams of acetone and a pre-cooled solution of 13.5 grams of sulfur dioxide in 90 grams of acetone. The monomer mixture is cooled to about 20°C. after which 0.85 gram of tert-butyl hydroperoxide catalyst as a 5% solution in acetone is added dropwise to the monomer mixture over a period of 2 hours, cooling being employed to maintain the temperature at about 20° to 25°C. The white precipitate which formed is separated from the reaction medium, is washed thoroughly with acetone and then is dried in a vacuum oven at 50°C. overnight. The product (46 grams) is water-soluble and has an RSV of 0.47 (determined on a 0.1% solution in aqueous 0.1 molar sodium chloride at 25°C.). Elemental analysis indicated that the copolymer is a 1:1 molar copolymer.

Part 2 - An N-methyldiallylamine-sulfur dioxide copolymer-epichlorohydrin is prepared as follows: 22.45 grams (equivalent to 1.05 moles of the diallylamine monomer units) of the copolymer prepared in Part 1 of this example is dissolved in 50 grams of water in a reaction flask to give a light yellow solution having a pH of 1.2. After adjustment of the pH of the solution to 7.1 with one molar aqueous sodium hydroxide, 14.6 grams (1.58 moles) of epichlorohydrin and then 32 grams of water are added to the solution, giving 25% reactions solids. The contents of the flask are heated to 40°C. and the reaction monitored by determining the viscosity of a 25% solids solution at 25°C. using Gardner-Holdt viscosity tubes. Within 15 minutes the viscosity has reached about D on the Gardner-Holdt scale, and the reaction is essentially terminated by adding 4 grams of 1 molar hydrochloric acid and 412 grams of water and cooling. The resin solution contains 5.2% total solids and has a pH of 3.7. An additional amount of one molar hydrochloric acid is added to adjust the pH to 3.0.

EXAMPLE 4

The procedure of Example 1 is repeated except that in this example the polymer which is reacted with epichlorohydrin is a 1:1 molar copolymer of N-methyldiallylamine and dimethyldiallylammonium chloride. The copolymer is prepared according to Example 1, Part 1 except that a mixture of 35 grams of N-methyl-diallylamine hydrochloride and 35 grams of dimethyldiallylammonium chloride is substituted for the 117 grams of diallylamine hydrochloride, and 125 grams of dimethylsulfoxide are used. The copolymer (30 grams) is water soluble, has an RSV of 0.21 (determined on a 0.1% solution in aqueous 0.1 molar sodium chloride at 25°C.) and contains by analysis 50 molar % quaternary amine groups and 50 molar % tertiary amine groups. This copolymer (26.65 grams; equivalent to 0.086 mole of diallylamine monomer units) is dissolved in 50 grams of water to give a viscous tan solution of pH 1.2. The pH of the solution is adjusted to 8.5 with 1 molar aqueous sodium hydroxide, and then 11.8 grams of epichlorohydrin and 19.6 grams of water are added to the solution to give 30% reaction solids. The contents of the flask are heated to 45°C. and the reaction continued to a Gardner-Holdt viscosity value greater than B, at which time the reaction is terminated by adding 5 grams of 1 molar hydrochloric acid and 520 grams of water. The resin solution contains 3.9% total solids and has a pH of 2.7.

EXAMPLE 5

Part 1 - A copolymer of acrylamide and diallylamine hydrochloride is prepared as follows. An open reaction vessel equipped with a mechanical stirrer is charged with 62.5 grams of diallylamine, 125 grams of water and 62.5 grams of concentrated hydrochoric acid, the pH being approximately 4.5. To the vessel is then added 62.5 grams of acrylamide dissolved in 112 grams of water. The contents of the vessel are thoroughly mixed and there is added to the vessel with stirring 1.5 grams of a 1% aqueous solution of ferrous ammonium sulfate, followed by 0.25 gram of a 1% aqueous solution of potassium metabisulfite and 0.25 gram of a 1% aqueous solution of ammonium persulfate, the latter 2 solutions being added simultaneously and dropwise. The reaction proceeds exothermically starting at ambient temperature (27°C.) and rises to 61°C. at which temperature heat ceases to be evolved. The resulting copolymer solution is cooled by diluting to about 6% copolymer solids. A portion of the solution is dialyzed against distilled water and then freeze dried at 40°–45°C. under vacuum overnight. The isolated solid is water-soluble, has an RSV of 0.91 as determined on a 0.1% solution in aqueous 0.1 molar sodium sulfate at 25°C. and contains by analysis 16.2% nitrogen, 19.32% oxygen and 5.24% chloride ion, indicating that the copolymer contains 19.6 weight % diallylamine hydrochloride units.

Part 2 - A resin from the above copolymer and epichlorohydrin is prepared as follows: 5 grams (equivalent to 7.5 millimoles of the diallylamine monomer units) of the solid polymer of diallylamine hydrochloride and acrylamide isolated above in Part 1, is dissolved in 40 grams of water and one molar aqueous sodium hydroxide is added to the solution to adjust the pH to 8.5. The solution is transferred to a reaction flask equipped with a thermometer, stirrer and heating mantle and 1.0 gram (11 millimoles) of epichlorohydrin is added to the flask along with sufficient water to give a reaction medium of 12.5% solids. The contents of the flask are then heated to 55°–56°C. and the reaction monitored by determining the viscosity of a 12.5% solids solution at 25°C. using Gardner-Holdt viscosity tubes. After 70 minutes, the viscosity has reached J⁻ on the Gardner-Holdt scale, and the reaction is terminated by adding 3 grams of 1 molar hydrochloric acid and 65 grams of water and cooling. The resin solution has a pH of 1.8.

EXAMPLE 6

The procedure of Example 5 is repeated except that in this example the copolymer which is reacted with epichlorohydrin is a copolymer of acrylamide and N-methyldiallylamine hydrochloride. The copolymer is prepared according to Example 5, Part 1 except that 62.5 grams of N-methyldiallylamine is substituted for the 62.5 grams of diallylamine. The copolymer is water-soluble, has an RSV of 0.78 (determined on a 0.1% solution in aqueous 0.1 molar sodium sulfate at 25°C.) and contains by analysis 15.1% nitrogen, 20.21% oxygen and 4.56% chloride ion, indicating that the copolymer contains 19 weight % N-methyldiallylamine hydrochloride units. This copolymer (7 grams; equivalent to 8 millimoles of the N-methyldiallylamine monomer units) is dissolved in 50 grams of water and one molar aqueous sodium hydroxide is added to adjust the pH to 8.6. Next 1.11 grams (12 millimoles) of epichlorohydrin and 5.5 grams of water are added to the solution to give 12.5% reactions solids. The contents of the flask are heated to 55°–56°C. and the reaction is continued to a Gardner-Holdt viscosity value of J, at which time (30 minutes) the reaction is terminated by adding 1.5 grams of 1 molar hydrochloric acid and 87 grams of water. The resin solution has a pH of 2.2.

EXAMPLES 7–14

Portions of the epichlorohydrin-copolymer reaction products of Examples 3 to 6, are activated by the addition of sodium hydroxide to give a pH of 10 and then are evaluated in handsheets according to the general procedure of Example 1. The results of these examples are summarized below in Table I.

TABLE I

| Example | Activated resin from example | Percent resin added based on pulp | Basis weight | Wet tensile lb./in. width | | Dry tensile lb./in. width | | Burst (p.s.i.) |
| --- | --- | --- | --- | --- | --- | --- | --- | --- |
| | | | | Uncured | Cured | Uncured | Cured | |
| 7 | 3 | 1.0 | 41.8 | 8.80 | 8.21 | | 27.2 | 56.5 |
| 8 | 4 | 1.0 | 41.7 | 5.85 | 6.31 | | 24.9 | 47.5 |
| 9 | 5 | 0.5 | 39.8 | 2.12 | 2.80 | 23.8 | 23.0 | |
| 10 | 5 | 1.0 | 39.2 | 2.52 | 3.28 | 25.2 | 25.4 | |
| 11 | 5 | 2.0 | 39.1 | 2.62 | 3.22 | 25.4 | 25.6 | |
| 12 | 6 | 0.5 | 39.2 | 3.28 | 3.56 | 25.8 | 26.2 | |
| 13 | 6 | 1.0 | 40.0 | 3.42 | 4.02 | 25.4 | 26.0 | |
| 14 | 6 | 2.0 | 39.8 | 3.50 | 4.16 | 24.8 | 25.8 | |

EXAMPLE 15

Part 1 - A poly($\beta$-propionamidodiallylamine hydrochloride) is prepared as follows. To a reaction vessel charged with 213 grams (3 moles) of acrylamide dissolved in 213 grams of distilled water is added with stirring over a one hour period 291 grams (3 moles) of diallylamine. The temperature of the reaction mixture rises to 60°C. and is maintained thereat for an additional 6 hours after which time the mixture is cooled and a total of 715 grams of $\beta$-propionamidodiallylamine is recovered as a yellow solution. A mixture of 47.7 grams (0.2 mole) of the above solution and 19.4 grams (0.2 mole) of concentrated hydrochloric acid is introduced into a pop bottle equipped with a magnetic stirring bar and the bottle contents sparged with nitrogen for 1 hour. Next 0.5 gram of 90% tert-butyl hydroperoxide is added and the bottle immersed in a 60°C. bath and maintained therein for 24 hours, after which time the bottle is removed from the bath, cooled and vented. The product is an extremely viscous, orange-red solution which contains 60.7% solids and by analysis 8.33% nitrogen and 10.5% chloride ion, and has an RSV of 0.23 as determined on a 1% solution in aqueous 1 molar sodium chloride at 25°C.

Part 2 - A poly($\beta$-propionamidodiallylamine)-epichlorohydrin resin is prepared as follows: 43 grams (equivalent to 0.128 mole of $\beta$-propionamidodiallylamine hydrochloride monomer units) of the poly($\beta$-propionamidodiallylamine hydrochloride) solution prepared above in Part 1 is adjusted to a pH of 8.5 with one molar aqueous sodium hydroxide (about 59 grams). The solution is transferred to a reaction flask and 26.5 grams of water and then 17.8 grams (0.192 mole) of epichlorohydrin is added to the flask. The contents of the flask are then heated to 40°C. and the reaction monitored by determining the viscosity using Gardner-Holdt viscosity tubes. After 1 hour the viscosity has reached C on the Gardner-Holdt scale, and the reaction is terminated by adding 125 grams of water and 20 grams of aqueous 1 molar hydrochloric acid. The mixture is then heated to 60°C. and additional hydrochloric acid is added, as necessary to maintain the pH at 2.0. The resulting product solution contains 10.4% solids and has a Brookfield viscosity of 11 cps.

EXAMPLE 16

Part 1 - A terpolymer of N-methyldiallylamine hydrochloride, acrylamide and sulfur dioxide is prepared according to the procedure of Example 3, Part 1, except that the reaction flask contains a solution of 26.4 grams of N-methyldiallylamine hydrochloride, 12.4 grams of acrylamide and 11.2 grams of sulfur dioxide in 440 grams of acetone, 0.6 gram of tert-butyl hydroperoxide catalyst as a 5% solution in acetone is used, the reaction temperature is maintained at 23° to 28°C. during the catalyst addition, and the reaction mixture is stirred for an additional hour at 25° to 26°C. The product (45 grams) is water-soluble and has an RSV of 0.35 (determined on a 0.1% solution in aqueous 0.1 molar sodium chloride at 25°C.). The reaction mixture is filtered and the solid product is thoroughly washed with methanol. The white powdery polymeric product is then dried overnight at 45°–50°C. in a vacuum oven and amounts to 45 grams. The terpolymer so obtained contains 43.6% of the N-methyldiallylamine hydrochloride units.

Part 2 - A resin of epichlorohydrin and the terpolymer of N-methyldiallylamine hydrochloride, acrylamide and sulfur dioxide is prepared as follows: 20 grams of the terpolymer prepared in Part 1 of this example is dissolved in 50 grams of water in a reaction flask to give a solution having a pH of 1.3. After adjustment of the pH of the solution to 7.7 with ten molar and then one molar aqueous sodium hydroxide, 8.2 grams of epichlorohydrin and 21 grams of water are added to the solution giving 25% reaction solids. The contents of the flask are heated to 35° to 37°C. and the reaction is monitored by determining the viscosity using Gardner-Holdt viscosity tubes. The reaction is terminated when the viscosity has reached H on the Gardner-Holdt scale by adding 3 grams of 1 molar hydrochloric acid and 470 grams of water and cooling. The resin solution contains 4.42% solids. Additional amounts of one molar hydrochloric acid are added periodically to maintain the pH at 2.5.

EXAMPLES 17–23

Portions of the reaction products of Examples 15 and 16 are activated by the addition of sodium hydroxide to give a pH of about 10, aged for one-half hour and then evaluated in handsheets according to the general procedure of Example 1. The results of these examples are summarized below in Table II.

TABLE II

| Example | Activated resin from example | Percent resin added based on pulp | Basis weight | Wet tensile lb./in. width | | Dry tensile lb./in. width | |
|---|---|---|---|---|---|---|---|
| | | | | Uncured | Cured | Uncured | Cured |
| 17 | 15 | 0.25 | 40.2 | 2.1 | 3.6 | 24.0 | 24.0 |
| 18 | 15 | 0.5 | 39.4 | 2.6 | 4.3 | 23.4 | 24.4 |
| 19 | 15 | 1.0 | 40.4 | 3.3 | 5.4 | 25.2 | 26.4 |
| 20 | 15 | 2.0 | 40.3 | 3.8 | 6.1 | 25.0 | 26.4 |
| 21 | 16 | 0.5 | 40.0 | 3.2 | 3.9 | 26.3 | 26.2 |
| 22 | 16 | 1.0 | 39.5 | 4.5 | 5.0 | 26.0 | 25.4 |
| 23 | 16 | 2.0 | 40.7 | 5.3 | 5.9 | 26.9 | 27.2 |

EXAMPLE 24

A poly(N-methyldiallylamine hydrochloride) having an RSV of 0.16 (measured on a 0.1% solution in aqueous one molar sodium chloride at 25°C.) is prepared according to the procedure of Example 2 at a 10-fold scale up and the polymer (518 grams) is dissolved in 1,200 grams of water in a reaction vessel to give a solution having a pH of 0.7. After adjustment of the pH of the solution to 8.5 with one molar aqueous sodium hydroxide, 481 grams of epichlorohydrin and then 307 grams of water are added to the solution, giving 30% reaction solids. The contents of the vessel are heated to 54° to 55°C. and the reaction monitored by Gardner-Holdt viscosity tubes. When the viscosity has reached C+ on the Gardner-Holdt scale (90 minutes) the reaction medium is diluted to give a resin solution of 5.4% total solids and the resin solution is adjusted to a pH of 3.0 with one molar hydrochloric acid. A portion of the above resin solution (190.5 grams) is oven dried at 150°C. for 3 hours, giving 5.4 grams of a brittle orange-yellow solid which is sensitive to moisture and readily soluble in water.

The product of this example is evaluated in handsheets according to the procedure of Example 1 using (A) a portion of the resin solution (designated as solution A) and (B) a 4.5% aqueous solution of the dried resin product (designated as solution B), both solutions being activated for use by adjusting the pH to 10 to 11 with sodium hydroxide. The results are summarized below in Table III.

TABLE III

| Resin solution | Percent resin added based on pulp | Basis weight | Dry tensile (lb./in. width) after curing | Wet tensile lb./in. width | | Burst (p.s.i.) |
|---|---|---|---|---|---|---|
| | | | | Uncured | Cured | |
| A | 1.0 | 39.4 | 37.6 | 8.1 | 9.1 | 60.6 |
| B | 1.0 | 39.2 | 30.0 | 8.9 | 9.4 | 61.2 |

What I claim and desire to protect by Letters Patent is:

1. A paper product having improved wet and dry strength comprising sheeted cellulosic fibers treated with from about 0.1% to about 5% by weight, based on the dry weight of fibers, of a water-soluble resinous reaction product of (A) a linear polymer comprising units of the formula

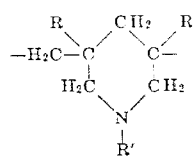

where R is hydrogen or lower alkyl, and R' is hydrogen, alkyl or a substituted alkyl group wherein the substituent is a group which will not interfere with polymerization through a vinyl double bond and is selected from the group consisting of carboxylate, cyano, ether, amino, amide, hydrazide and hydroxyl groups and (B) from about 0.5 to about 1.5 moles of an epihalohydrin per mole of secondary plus tertiary amine present in said polymer.

2. The paper product of claim 1 wherein (A) is a homopolymer.

3. The paper product of claim 2 wherein the epihalohydrin is epichlorohydrin.

4. The paper product of claim 3 wherein (A) is a homopolymer of diallylamine.

5. The paper product of claim 3 wherein (A) is a homopolymer of N-methyldiallylamine.

6. The paper product of claim 3 wherein (A) is a homopolymer of β-propionamidodiallylamine.

7. The paper product of claim 1 wherein (A) is a copolymer having units of said formula and units of at least one different monomer selected from vinylidene monomers and sulfer dioxide.

8. The paper product of claim 7 wherein the epihalohydrin is epichlorohydrin.

9. The paper product of claim 8 wherein (A) is a copolymer of N-methyldiallylamine and sulfur dioxide.

10. The paper product of claim 8 wherein (A) is a copolymer of N-methyldiallylamine and dimethyldiallylammonium chloride.

11. The paper product of claim 8 wherein (A) is a copolymer of N-methyldiallylamine and diallylamine.

12. The paper product of claim 8 wherein (A) is a copolymer of diallylamine and acrylamide.

13. The paper product of claim 8 wherein (A) is a copolymer of N-methyldiallylamine and acrylamide.

14. The paper product of claim 8 wherein (A) is a terpolymer of diallylamine, acrylamide and sulfur dioxide.

* * * * *